May 29, 1923.

B. O. VOLLENDORF

MOTOR TRUCK

Filed Oct. 11, 1920     3 Sheets-Sheet 2

1,456,747

Inventor
Benjamin O. Vollendorf
By Young and Young
Attorneys

Witness
T. P. Britt

May 29, 1923.

B. O. VOLLENDORF

MOTOR TRUCK

Filed Oct. 11, 1920

Patented May 29, 1923.

1,456,747

UNITED STATES PATENT OFFICE.

BENJAMIN O. VOLLENDORF, OF IRON MOUNTAIN, MICHIGAN.

MOTOR TRUCK.

Application filed October 11, 1920. Serial No. 416,256.

*To all whom it may concern:*

Be it known that BENJAMIN O. VOLLENDORF, a citizen of the United States, and resident of Iron Mountain, in the county of Dickinson and State of Michigan, have invented certain new and useful Improvements in Motor Trucks; and I do hereby declare the following is a full, clear, and exact description thereof.

My invention relates to new and useful improvements in vehicles, such as motor trucks, and has particular reference to the dumping mechanism thereof.

Users of motor trucks well know that it is extremely difficult to dump the truck of ordinary construction on a narrow road, or in a small space, and it is also difficult to maneuver the truck out of the road or such space after discharging its contents. Therefore one important object of this invention is to provide a motor truck having a revolving body frame carrying the body receptacle and power plant and which is capable of being moved to practically any angle with respect to the axis of the chassis.

An additional important object is to provide a truck of this character with a body frame, carrying the power plane and driver's cab, which can be completely reversed end for end with the chassis frame to permit the truck to be readily moved from a narrow space without turning or backing.

A further object of the invention is to provide an improved turn table construction by which the body frame may be retained horizontal at all times, irrespective of the position which it assumes in connection with the chassis frame.

With these general objects, and the obvious advantages resulting therefrom, in view, the invention resides in the novel features of construction, combination and arrangement of parts which will be hereinafter more particularly described and claimed.

In the accompanying drawings.

Figure 1:
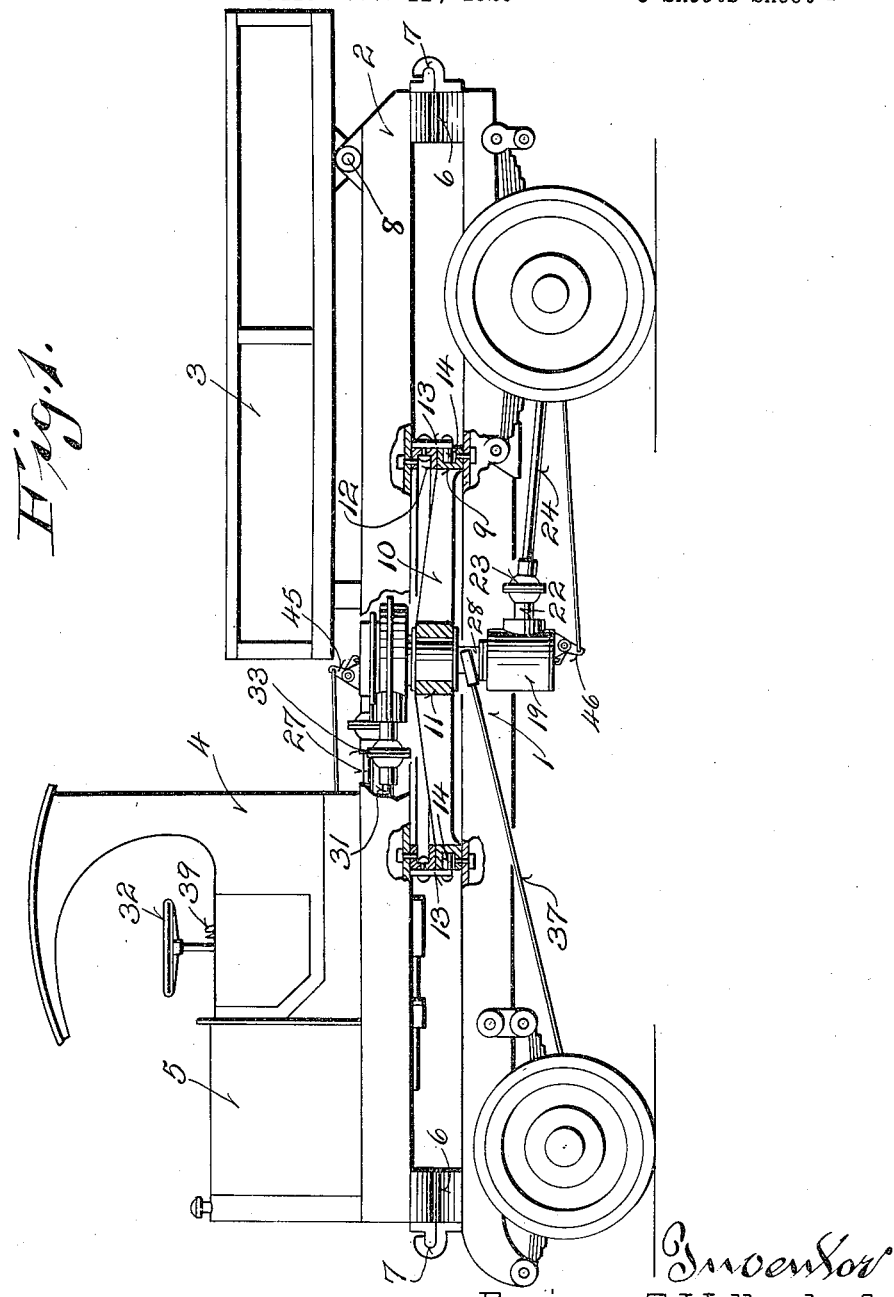
Figure 1 represents a side elevational view, partly in section, of a motor truck constructed in accordance with my invention.

Referring more particularly to Figure 1 of the drawings, it will be seen that my invention includes a wheel supported chassis frame 1 having a body frame 2 mounted thereon, which frame carries a body receptacle 3, a driver's cab 4, and a suitable engine mounted beneath the hood 5. When the body frame 2 is aligned with the chassis frame 1, its opposite ends rest upon track members 6 and are locked by suitable means 7. The body receptacle 3 is preferably hinged or pivoted as at 8 to the rear end of the body frame, so that it may be readily tilted when it is desired to dump the contents therefrom.

A circular track 9 formed of channel metal, is fixed by its lower flange to the bars of the chassis frame and is radially braced by spider arms 10, which project therefrom and support a central spider bearing 11. This track 9 forms one portion of a turntable, the other part being a movable annular track 12, which is carried by the body frame 2 and rests upon the upper flange of the channeled lower track. The track 12 has a plurality of depending retaining arms 13, which carry on their lower ends rollers or the like 14 for engagement in the channel of the lower track 9. Thus the retaining arms 13 and the elements 14 effectively hold the body frame against shifting with respect to the chassis frame, and hold the former substantially horizontal under all conditions and throughout the entire course of its movement.

Figure 2:
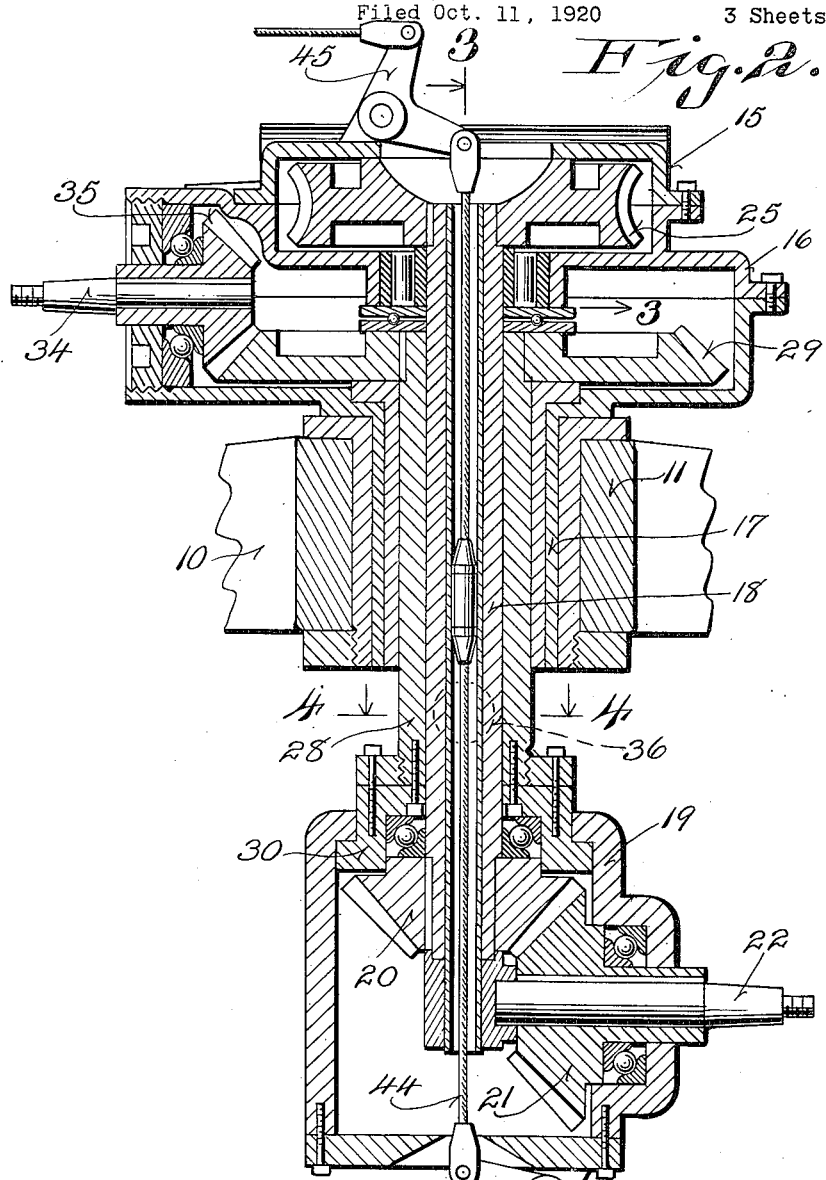
Figure 2 is a vertical sectional view through the central transmission and steering units.
Figure 3:
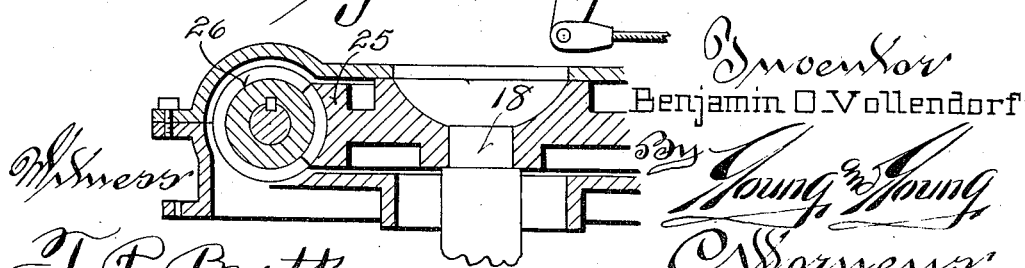
Figure 3 is a detail vertical sectional view taken substantially on the plane of the line 3—3 of Figure 2.
Figure 4:
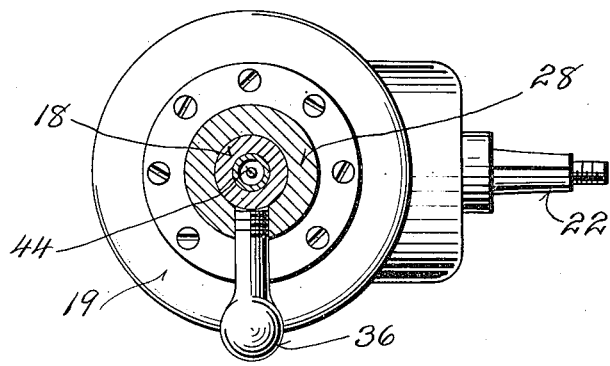
Figure 4 is a horizontal section on the plane of the line 4—4 of Figure 2.

A transmission and steering unit such as is shown in Figure 2 is supported within the spider bearing 11 and preferably consists of superimposed housings, the upper one forming a transmission gear housing 15, and the lower a steering gear housing 16. The lower housing 16 carries a depending sleeve 17 which is journalled in said bearing 11. Extending centrally through the housings 15 and 16 and the sleeve 17 is a tubular transmission shaft 18, the lower end of which is projected into a gear case 19 and has a bevel pinion 20 keyed thereto. This pinion is in turn meshed with a second similar pinion 21 fixed on the end of the drive shaft 22. As shown in Figure 1, this shaft 22 is connected by means of a universal 23 with a second drive shaft 24 extending to the truck differential.

The upper end of said tubular shaft 18 extends into the upper housing 15 and has a worm gear 25 fixed thereto, which worm gear is meshed with a worm 26 driven by the power shaft 27. Interposed between the shaft 18 and the sleeve 17 is a shaft enclosing sleeve 28, the upper end of which carries a bevel gear 29, whereas the lower end has a collar 30 fixed thereto. The gear 29 is located in the lower housing 16 and the collar 30 forms a rotatable connection with the steering gear case 19.

A shaft 31 operated by the steering wheel 32 is connected through a universal 33 with a stub shaft 34 projecting from one side of the lower housing 16. Within this housing and fixed to said stub shaft 34 is a bevel pinion 35, the teeth of which mesh with the teeth of the bevel gear 29 so that upon actuation of the steering wheel 32, the sleeve 28 will be rotated and a steering knuckle 36 shifted. A steering rod 37 connects the knuckle 36 with the steerable wheels of the chassis frame and controls the direction of movement of the vehicle.

Figure 5:
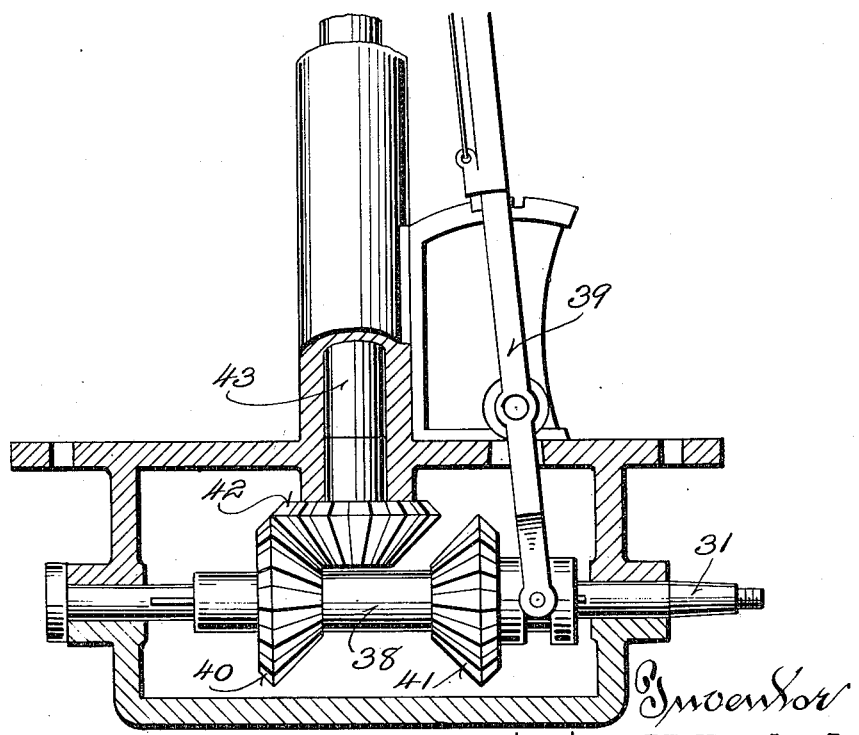
Figure 5 is a detail vertical section through the means for reversing the direction of action of the steering mechanism.

Inasmuch as the vehicle can be steered when the body frame is disposed, as shown in Figure 1, or when it is reversed end for end with the cab located over the rear wheels, it is essential that means be provided for reversing the action of the steering wheel 32 so that the driver will have no difficulty in turning the steerable wheels in a proper direction, regardless of his location with respect thereto. To accomplish this result, I provide the shaft 31 with a sliding sleeve 38, which can be shifted by a suitable lever 39 to move either of the bevel gears 40 or 41 carried thereby into co-operative engagement with a similar gear 42 on the lower end of the steering post 43. (See Figure 5). Thus when the driver's cab is located in its normal position, and when the gears 41 and 42 are meshed, correct steering can be obtained even though the body frame is reversed end for end with the chassis frame.

The brake bands of the rear wheels of the vehicle are actuated through a suitable brake lever, disposed in the driver's cab, connection between these parts being procured through the transmission and steering unit heretofore described. In other words a cable or other flexible connection 44 is extended through the tubular shaft 18 and has its opposite ends fixed to corresponding arms of bell cranks 45 and 46. A bell crank 45 is connected with said brake lever, whereas the bell crank 46 is joined with the brake bands. When it is desired to rotate the body, the brakes are set on the rear wheels. Power is applied to the worm shaft and the body is caused to rotate around the stationary worm gear 25. As the body rotates, the steering wheel will spin as the small bevel gear travels around the large gear which is attached to the vertical steering shaft member.

Various changes may be made in the form and proportions of the different parts of the invention, and in the general association of such parts, without departing from the principles thereof or sacrificing any of the obvious advantages.

I claim:

1. In a power vehicle, a vehicle supporting frame, means for driving the vehicle frame, a body frame rotatably mounted on the supporting frame, steering rods connected to the normally front wheels of said vehicle, steering means carried by the body frame connected with the vehicle frame and cooperating with said steering rods for steering the vehicle, and means for turning the body frame end for end with the vehicle frame to dispose said steering means in different positions with respect to the latter.

2. In a power vehicle, a vehicle supporting frame, a body frame rotatably mounted on the supporting frame, a drive shaft for actuating the differential, a beveled gear thereon, a second beveled gear meshing with said first mentioned beveled gear, a sleeve carrying said second beveled gear, means for rotating said sleeve, a power plant mounted on the body frame at one end and connected with said means, and means for turning the body frame end for end with the vehicle frame to dispose said power plant at either end of the vehicle frame.

3. In a power vehicle, a vehicle supporting frame, a body frame on the supporting frame, a load receptacle on said body frame, a motor on said body frame, means for cooperating with said motor for moving the body frame to different angles with respect to the vehicle frame, and means for supporting said load receptacle on said body frame and permitting the pivotal movement thereof whereby its contents may be dumped.

4. In a power vehicle, a vehicle supporting frame, means for driving the vehicle frame, means for steering said vehicle frame, a body frame movably disposed on the vehicle frame, a load receptacle on said frame, a power plant mounted on the body frame, a steering gear carried by the body frame, and a centrally located means for distributing the operation of the power plant and steering gear to the vehicle frame driving means and the steering means of the vehicle frame.

In testimony that I claim the foregoing I have hereunto set my hand at Iron Mountain, in the county of Dickinson and State of Michigan.

BENJAMIN O. VOLLENDORF.